L. LEE.
AIR HEATING FURNACE.
APPLICATION FILED SEPT. 22, 1920.
1,362,579.
Patented Dec. 14, 1920.
3 SHEETS—SHEET 1.
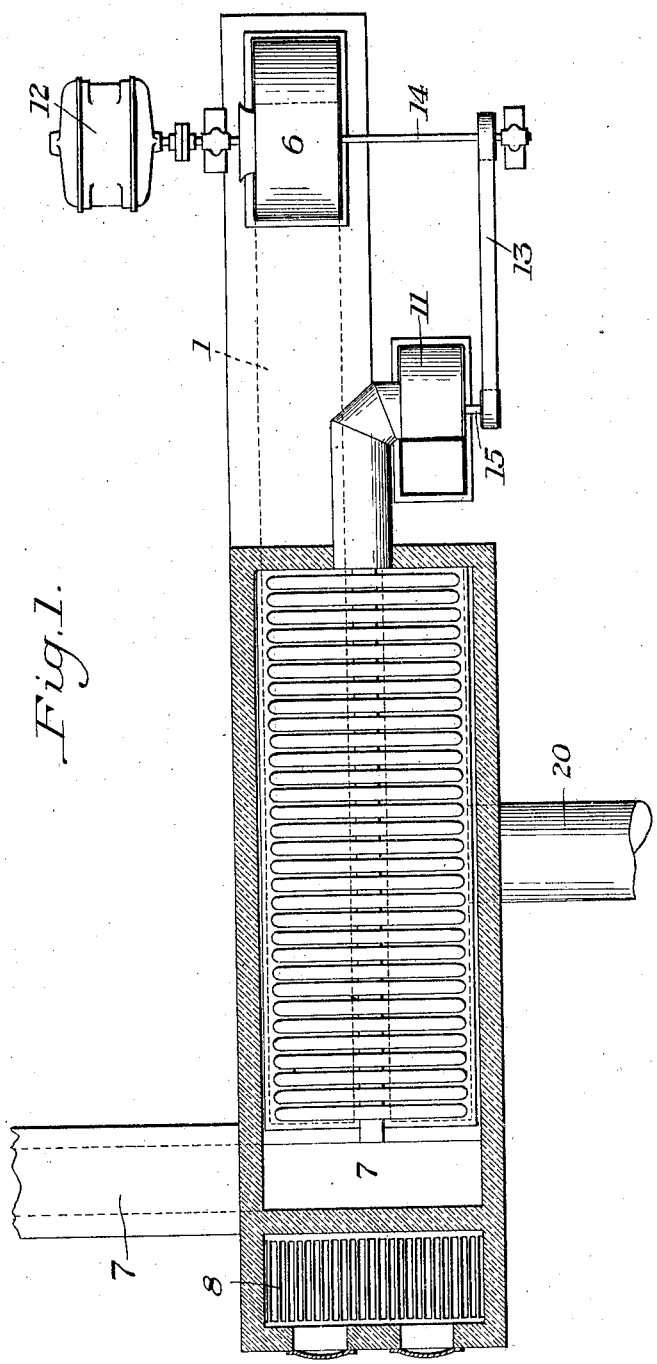

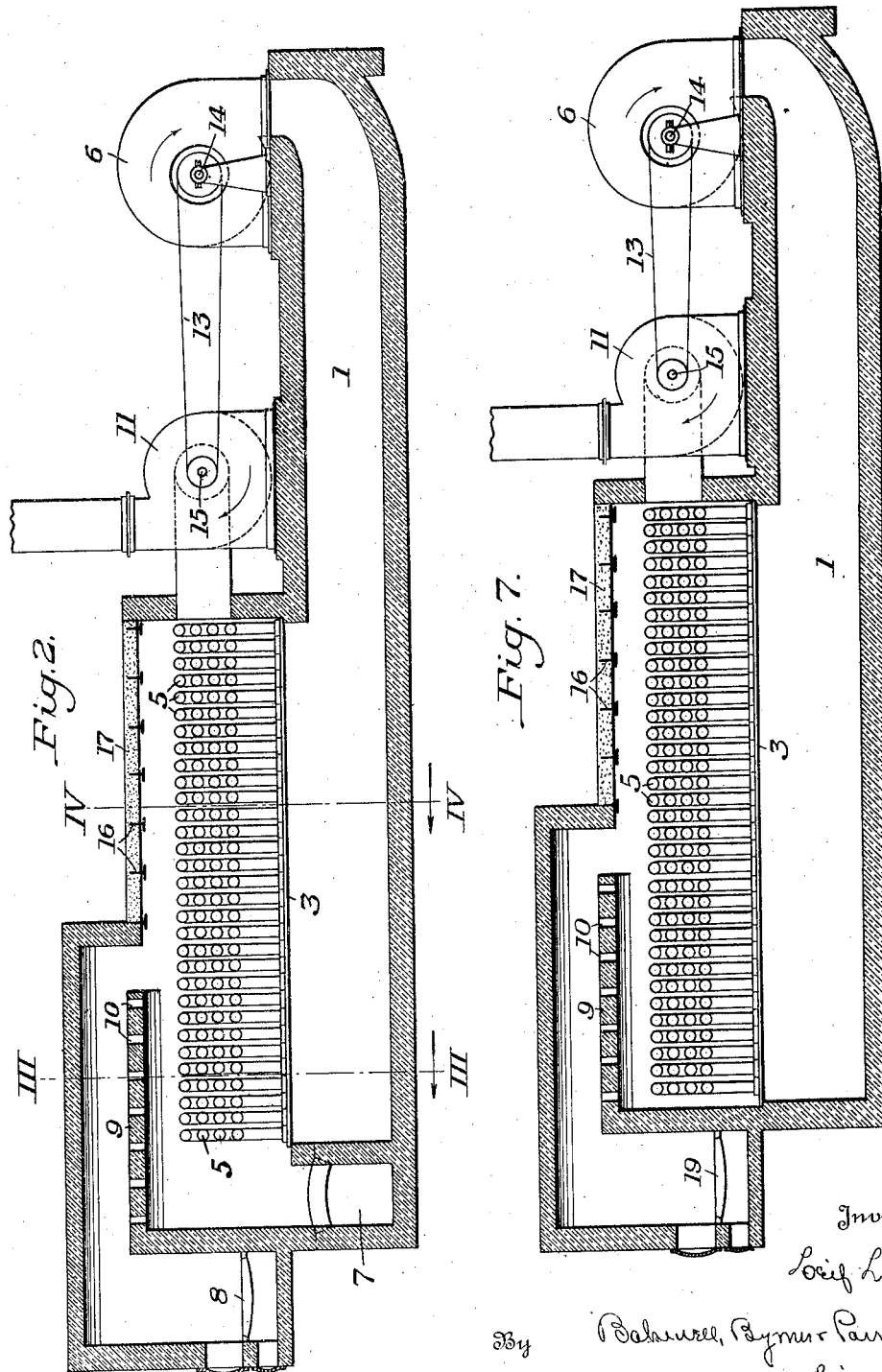

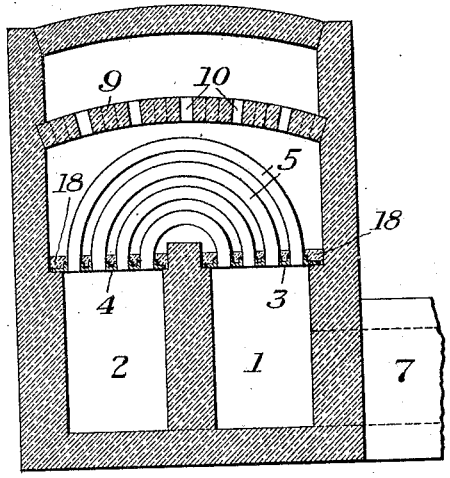
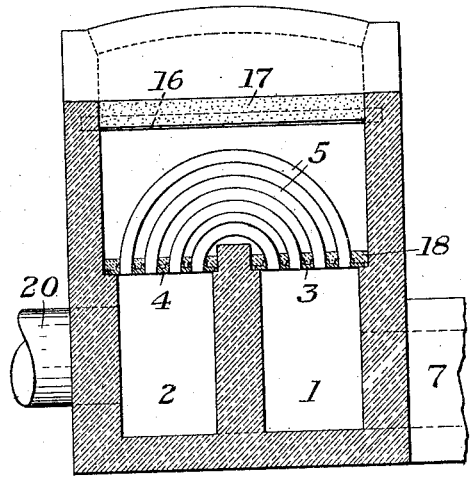
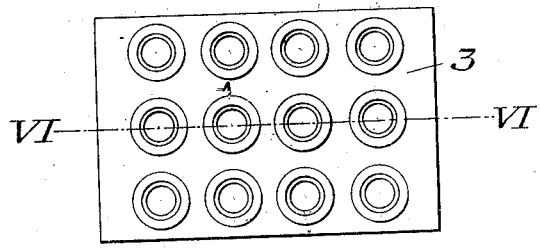
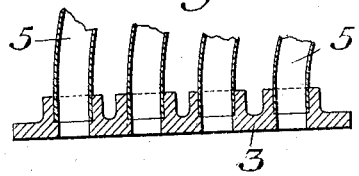

UNITED STATES PATENT OFFICE.

LEIF LEE, OF YOUNGSTOWN, OHIO.

AIR-HEATING FURNACE.

1,362,579. Specification of Letters Patent. Patented Dec. 14, 1920.

Application filed September 22, 1920. Serial No. 412,065.

*To all whom it may concern:*

Be it known that I, LEIF LEE, a citizen of the United States, residing at Youngstown, in the county of Mahoning and State of Ohio, have invented a new and useful Improvement in Air-Heating Furnaces, of which the following is a full, clear, and exact description.

My invention relates to air heating furnaces of general application where it is desired to heat large volumes of air for buildings and the like.

The object of the invention is to simplify the construction and insure some of the parts against undue heating and at the same time get the full benefit of the hot gases which are used for the purpose of heating the air.

My invention will be best understood by reference to the accompanying drawings forming a part hereof and in which:

Figure 1 is a plan view of the heating apparatus partially in section.

Fig. 2 is an elevation partly in section.

Fig. 3 is a cross section on line III—III of Fig. 2.

Fig. 4 is a cross section on line IV—IV of Fig. 2.

Fig. 5 is a detail plan view of the header plate.

Fig. 6 is a cross section on line VI—VI of Fig. 5, and

Fig. 7 is a modification of the device shown in Fig. 2.

Referring to the drawings, the device comprises two passages 1 and 2, preferably arranged parallel to each other. One of these passages, as for instance 1, constitutes the inlet through which the air to be heated is conducted; and the two passages 1 and 2 are each provided with a header plate 3 and 4, respectively, which are adapted to receive the ends of pipes 5. These pipes, in the embodiment shown, are bent so as to connect with openings in the header plates and thereby connect the passages 1 and 2 together. The other walls of the passages 1 and 2 may be of any suitable material, and the passages may have any desired shape, although they are shown in the present embodiment as being rectangular. Connected with the passage 1 is a fan 6 of any desired construction for the purpose of forcing the air through the passage 1, pipes 5, and passage 2. The pipes 5 are located in a heating chamber and are subjected to gases of high temperature, either directly or indirectly, or both. In the arrangement shown in Fig. 2, the pipes 5 are heated by either waste gases supplied through the passage 7, and which come into direct contact with the pipes 5, or by combustion gases produced from fuel on the grate 8 which come into contact with the pipes 5 indirectly through a baffle wall 9 having perforations 10 therein. The wall 9 is placed over the pipes 5 which are nearest the source of combustion gas, and acts to prevent burning out of the pipes which are usually made of steel. During the course of the combustion gases from the grate 8, they are cooled somewhat and by the time the gases come into contact with the pipes 5 beyond the baffle wall they have become cooled so that there is no danger of burning out the tubes. The pipes 5, which are heated by the gases coming through the perforations, are protected from being burned out, because the gases come through in relatively small amounts.

The heating chamber is provided with a stack or flue through which the heating gases are exhausted. The exhaust is facilitated by a fan 11 which is, in some suitable manner, connected to the fan 6, both of said fans being driven from a common source, such as a motor 12, shown in Fig. 1. In this instance, the fans are connected by a belt 13 which is driven from a pulley on an extension shaft 14 connected to the fan 6. The belt 13 operates a pulley on the shaft 15 of the fan 11. By reason of this arrangement the pipes 5 are protected against being burned out, because when the fan, which forces the air through the pipes, stops, the fan which accelerates the movement of the heating gases is also stopped and this additional protective feature is thus provided.

The furnace walls may be of any desired construction or materials. A portion of the roof, however, is composed of a series of spaced I-beams 16 and a series of corrugated sheets 17. The sheets 17 are covered with sand or other similar material.

The header plate shown in Figs. 5 and 6 is a unitary structure having a series of openings therein and a series of circular projections having openings of the desired size to receive the ends of the pipes 5. The pipes are set into the position shown in Fig. 6. After the pipes are placed in the position shown, the header plates are covered over with sand or fire-clay 18.

In the arrangement shown in Fig. 7, there is only one source of heat. This is the grate 19 which supplies gases for heating the pipes 5 indirectly through the perforations 10 in the baffle wall 9. Aside from this feature, the arrangement of Fig. 7 is the same as that shown in Fig. 2.

The operation of my device is as follows:

The fans 6 and 11 are set into operation and the air to be heated is forced by the fan 6 through the passage 1, the pipes 5, and the passage 2, which conducts it to the point of use through the service pipe 20. During its course through the pipes 5, the air is divided into a plurality of small streams and is there subjected to the heat from the gases, which gases come from the grate 8 or the passage 7 or both, and in that manner the air is heated to the desired temperature. This temperature can be controlled by controlling the relative capacity of the fans 6 and 11, or by any other suitable means. The products of combustion and the waste gases which come into contact with the pipes 5 are conducted up the stack, and the movement of these heating gases is facilitated by the operation of the fan 11.

While I have described my invention in detail and have shown one specific embodiment of it, nevertheless I do not desire to be limited to the exact details shown and described, but desire it to be understood that I am to be limited only by the claims appended hereto and forming a part hereof.

I claim:

1. In an air heating device, the combination of two passages, pipes connecting said passages and conducting the air from one passage to the other, said pipes being bent upwardly, means for heating said pipes by hot gases, a fan for circulating the air through said passages and pipes, a fan for circulating the heating gases around said pipes, means for connecting said fans together, and a perforated baffle wall extending over said pipes where the heating gases are hottest, substantially as described.

2. In an air heating device, the combination of two passages, pipes connecting said passages and conducting the air from one passage to the other, means for heating the air while in said pipes, said means comprising means conducting waste gases of temperature insufficient to injure said pipes directly on said pipes, and means for applying combustion gases to said pipes indirectly, substantially as described.

3. In an air heating device, the combination of two passages, pipes connecting said passages and conducting the air from one passage to the other, means for supplying combustion gases to said pipes for heating same, and a perforated baffle wall extending over certain of said pipes to protect them from the high temperature of said combustion gases, substantially as described.

4. In an air heating device, the combination of two parallel passages, a plurality of pipes connecting said passages and conducting the air from one passage to the other, means for supplying combustion gases for heating said pipes by direct contact therewith, and a perforated baffle wall extending over certain of said pipes for protecting said pipes from said gases while at maximum temperature, substantially as described.

5. In an air heating device, the combination of two passages, means for dividing said air into a plurality of small streams in its course from one passage to the other, means for heating said air while so divided, said means comprising means for supplying waste gases directly to said dividing means and combustion gases indirectly thereto, substantially as described.

6. In an air-heating furnace, the combination of two passages, pipes for dividing the air into small streams and conducting said air from one passage to the other, means for heating the air while so divided, said means including means for bringing heated gases of a temperature insufficient to injure said pipes into direct contact with said pipes, and means for bringing indirectly hot gases of a higher temperature into contact with said pipes, substantially as described.

In testimony whereof I have hereunto set my hand.

LEIF LEE.